United States Patent
Shiraishi et al.

(10) Patent No.: US 8,266,368 B2
(45) Date of Patent: Sep. 11, 2012

(54) MEMORY CONTROLLER, MEMORY SYSTEM, AND CONTROL METHOD FOR MEMORY SYSTEM

(75) Inventors: Atsushi Shiraishi, Kanagawa (JP); Toshihiko Kitazume, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 496 days.

(21) Appl. No.: 12/501,091

(22) Filed: Jul. 10, 2009

(65) Prior Publication Data

US 2010/0011158 A1  Jan. 14, 2010

(30) Foreign Application Priority Data

Jul. 14, 2008  (JP) ................. 2008-183024

(51) Int. Cl.
*G06F 12/00* (2006.01)
*G06F 13/00* (2006.01)

(52) U.S. Cl. .......... 711/103; 711/154; 711/157

(58) Field of Classification Search .......... 711/103, 711/154, 157

See application file for complete search history.

(56) References Cited

U.S. PATENT DOCUMENTS 5,640,349 A  6/1997  Kakinuma et al.

2005/0015539 A1  1/2005  Horii et al.
2005/0223158 A1  10/2005  See et al.
2008/0049513 A1  2/2008  Jeong et al.

FOREIGN PATENT DOCUMENTS

CN  1613063 A  5/2005
JP  2008-65859  3/2008

OTHER PUBLICATIONS

Office Action issued Jan. 26, 2011, in Chinese Patent Application No. 200910140010.4 with English translation.
U.S. Appl. No. 13/045,087, filed Mar. 10, 2011, Kamizono.
Office Action issued Dec. 21, 2010, in Korean Patent Application No. 10-2009-0063614.

*Primary Examiner* — Midys Rojas
(74) *Attorney, Agent, or Firm* — Oblon, Spivak, McClelland, Maier & Neustadt, L.L.P.

(57) ABSTRACT

A memory controller for performing processing for writing data in an interleaved manner and in units of pages in a semiconductor memory section made up of chip 0 and chip 1, each of the chips composed of a large number of memory cells capable of storing two-bit data in one memory cell in units of two types of pages, the memory controller including a NAND I/F with the semiconductor memory section, and a CPU configured to execute writing programs repeatedly for two types of pages in a memory cell which belongs to the chip 0 and thereafter execute writing programs into a memory cell which belongs to the chip 1.

12 Claims, 8 Drawing Sheets

MEMORY CONTROLLER, MEMORY SYSTEM, AND CONTROL METHOD FOR MEMORY SYSTEM

This application claims the benefit of Japanese Application No. 2008-183024 filed in Japan on Jul. 14, 2008, the contents of which are incorporated herein by this reference.

BACKGROUND OF THE INVENTION

1. Field of the Invention

The present invention relates to a memory controller for accessing in a memory interleaving manner to a semiconductor memory section capable of storing multi-bit data in one memory cell, a memory system having the memory controller, and a control method for the memory system.

2. Description of the Related Art

Today, flash memory devices, which are non-volatile memory systems, are widely used as external storage devices for digital cameras or the like serving as hosts, startup memory systems for computer systems or the like because flash memory devices permit rewriting of data and are capable of maintaining data even in powered-off state.

Among such flash memory devices, NAND-type flash memory devices are known as non-volatile memory systems that realize large capacity and low cost. NAND-type flash memory uses electric charge that is injected via insulating film into a charge accumulating layer of memory cells of a semiconductor memory section as digital bit information, measures a difference in threshold voltage of transistors determined by an amount of electric charge, and reads out information.

To accomplish further increased capacity and reduced cost, aggressive research and development of NAND-type flash memory devices that use a multi-level technique for storing data of two or more bits in a single memory cell, so-called a multivalued flash memory device (hereinafter also called "multivalued memory"), has been conducted. For instance, Japanese Patent Application Laid-Open Publication No. 2001-93288 discloses a memory system capable of storing two-bit data by means of four different threshold voltages of one memory cell.

Meanwhile, memory interleaving is known as a technique for increasing access speed of a memory system. Memory interleaving increases data transfer rate by concurrently accessing a number of memory chips in parallel. For instance, Japanese Patent Application Laid-Open Publication No. 2007-334863 discloses a NAND-type flash memory device that accesses two memory chips in an interleaved manner.

BRIEF SUMMARY OF THE INVENTION

According to an aspect of the present invention, there can be provided a memory controller including a module configured to control an interface with a semiconductor memory section which is made up of a plurality of chips that are composed of a large number of memory cells capable of storing N-bit data (N being an integer $\geq 2$) in one memory cell in units of N types of pages, and a control section configured to execute writing programs repeatedly for all of the N types of pages in a memory cell which belongs to one of the chips and thereafter execute writing programs for all of the N types of pages in a memory cell which belongs to another one of the chips in an interleaved manner.

According to another aspect of the invention, there can be provided a memory system including a semiconductor memory section which is made up of a plurality of chips that are composed of a large number of memory cells capable of storing N-bit data (N being an integer $\geq 2$) in one memory cell in units of N types of pages, and a memory controller having a control section configured to, when performing processing for writing data into the semiconductor memory section in an interleaved manner, execute writing programs repeatedly for the N types of pages in a memory cell which belongs to one of the chips and thereafter execute writing programs for the N types of pages in a memory cell which belongs to another one of the chips.

According to yet another aspect of the present invention, there can be provided a control method for a memory system, the control method including: executing writing programs for N types of pages in a memory cell which belongs to one of chips of a semiconductor memory section, the semiconductor memory section being made up of a plurality of chips that are composed of a large number of memory cells capable of storing N-bit data (N being an integer $\geq 2$) in one memory cell in units of N types of pages; and further executing writing programs for the N types of pages in a memory cell which belongs to one of the memory cells of another one of the chips.

DETAILED DESCRIPTION OF THE PREFERRED EMBODIMENTS

First Embodiment

Hereinafter, a memory system 1 according to a first embodiment of the present invention will be described with reference to drawings.

Figure 1:
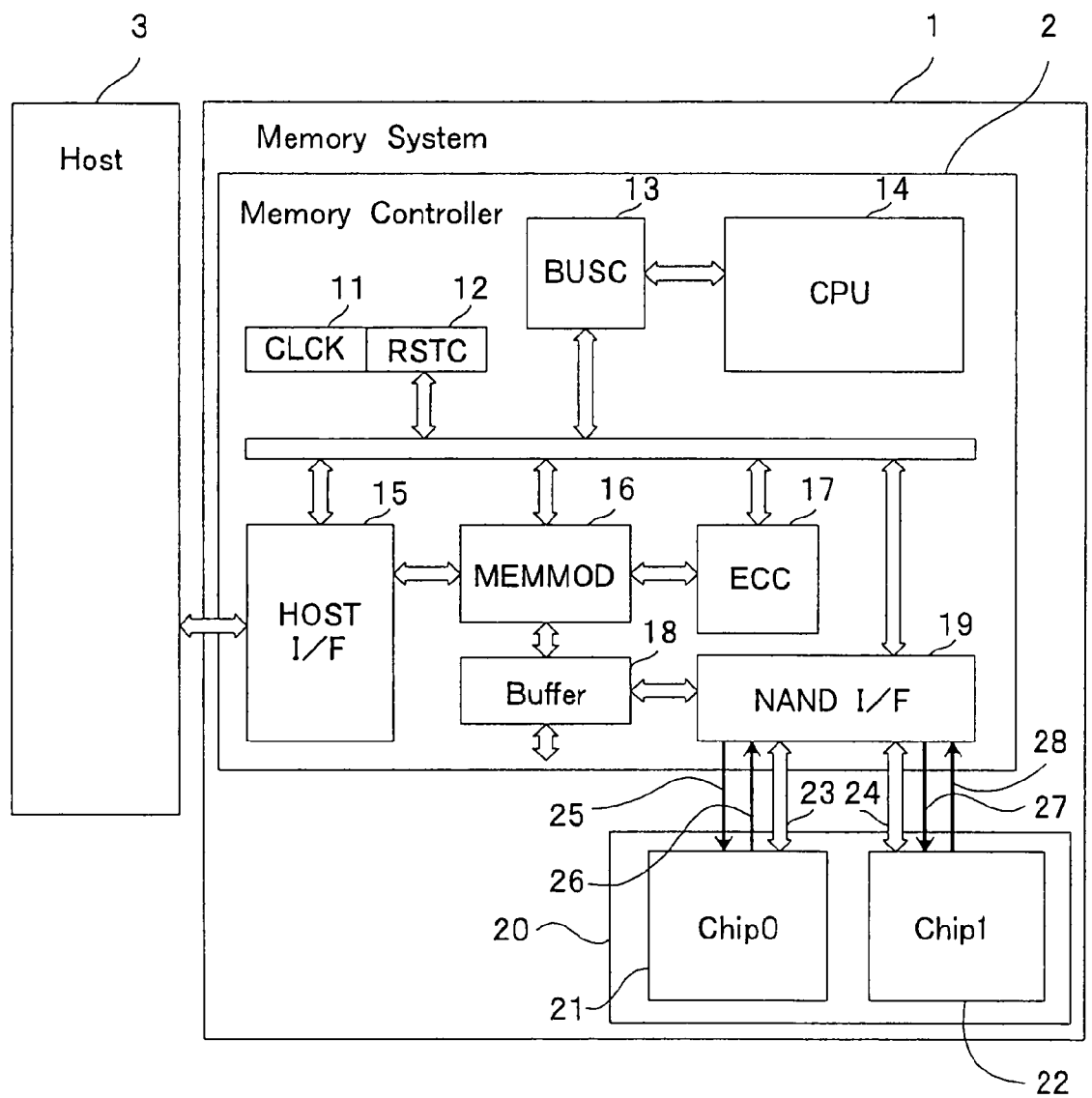
FIG. 1 shows a configuration of a memory system according to a first embodiment.

As shown in FIG. 1, the memory system 1 includes a semiconductor memory section (hereinafter also referred to as a "memory section") 20 configured to store data of a connected host 3, and a memory controller 2 configured to control programs for writing data to the memory section 20. The memory section 20 has two chips, a chip 0 (21) and a chip 1 (22). The chips 21 and 22 each have a large number of memory cells capable of storing N-bit data (N being an integer greater than or equal to 2) in one memory cell of NAND-type flash memory.

The memory controller 2 includes a CPU 14 for overall control, a HOST I/F (15) as a module configured to control an interface with the host 3, a NAND I/F (19) as a module configured to control an interface with the memory section, a clock control module (CLCK) 11, a reset control module (RSTC) 12, a bus control module (BUSC) 13, an Error Correcting Code (ECC) 17, a buffer memory (Buffer) 18, and a MEMMOD 16 which serves both as a memory control module and RAM.

The memory controller 2 is connected to the chip 0 (21) of the memory section 20 through a memory data bus 23, a selection signal line 25, and a Ready/Busy signal line 26. The memory controller 2 is also connected to the chip 1 (22) of the memory section 20 through a memory data bus 24, a selection signal line 27, and a Ready/Busy signal line 28. The memory controller 2 accordingly supports memory interleaving to concurrently access the chip 0 (21) and the chip 1 (22) in parallel, in other words, to program the chips in parallel. Here, the selection signal lines 25 and 27 are essential in the memory system 1, which is based on a memory interleaving manner, for the CPU 14 to send a selection signal (Chip Enable) to the chip 0 and the chip 1, respectively. Similarly, the Ready/Busy signal lines 26 and 28 used by the CPU 14 to monitor whether the respective chips are Busy or Ready are also essential for the memory system 1.

While FIG. 1 shows the two chips 21 and 22 are connected to NAND I/F (19) using their respective memory data buses 23 and 24, the chips may be connected using a common data bus.

Figure 2:
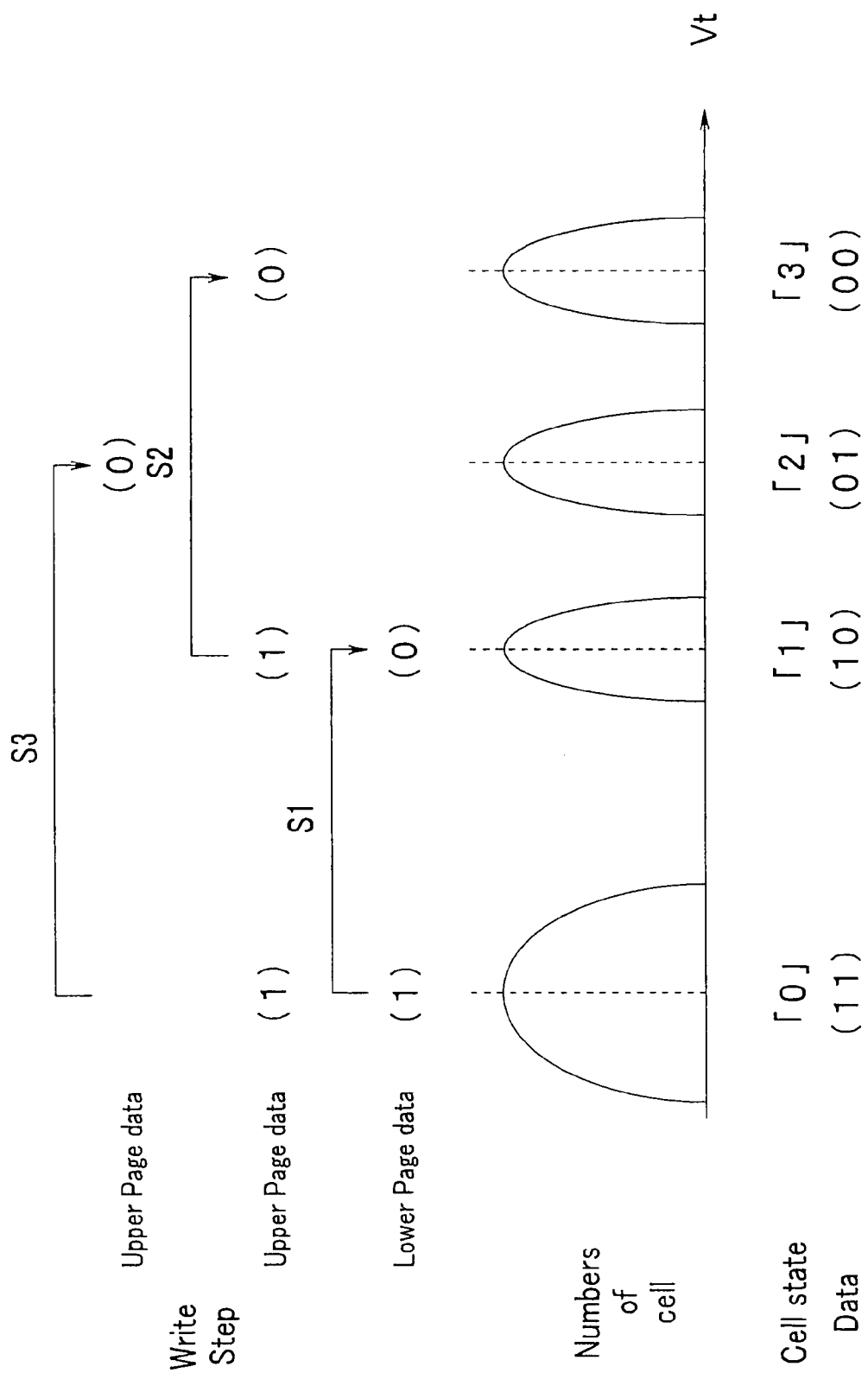
FIG. 2 is a diagram for illustrating relation between written data and threshold voltage in multivalued memory.

Now, relation between written data and threshold voltage in multivalued memory will be described using FIG. 2. FIG. 2 illustrates relation between written data and threshold voltage in multivalued memory, where a horizontal axis represents threshold voltage Vt and a vertical axis represents frequency of occurrence of a memory cell. In the memory cell shown in FIG. 2, two-bit data corresponds to four states, "0", "1", "2", and "3", and the figure shows an example where the states are defined in ascending order of threshold voltage of the memory cell. Data (XY) means that data of a first page is (Y) and data of a second page is (X). That is to say, state "0" corresponds to data (11), state "1" to data (10), state (2) to data (00), and state "3" to data (01). In an erased state in which no data is stored, the memory cell is in state "0".

To write two-bit data into one memory cell in the memory system 1, the data to be stored is divided into first page data and second page data, which are units of writing, and the first page data and the second page data are sequentially written into the single cell. In other words, a first page writing program is first executed by the CPU 14, and then a second page writing program is executed, causing the threshold voltage of the memory cell to shift to a higher level. Hereinafter, the first page may also be called a "lower page" and the second page may be called an "upper page".

When data written to the lower or upper page is "1", the threshold voltage of the memory cell does not change with execution of a writing program. However, when data written to the lower or upper page is "0", the threshold voltage of the memory cell changes with execution of a writing program.

Hereinafter, execution of writing programs for two-bit data by the CPU 14 will be described in greater detail using FIG. 2. As already described, the memory cell in erased state is in state "0". First, data of the lower page is written. Here, as shown at S0 in FIG. 2, even after the lower page data which is (1) is written into the memory cell, the memory cell remains in state "0". On the other hand, as shown at S1 in FIG. 2, when the lower page data is (0), the memory cell after writing of the data becomes state "1".

Next, data of the upper page is written. As shown at S2 in FIG. 2, when data (0) is externally supplied to the memory cell which is in state "1" as a result of writing to the lower page, that is, if data (0) is written to the memory cell, the memory cell becomes state "3". Also, as shown at S3 in FIG. 2, when data (0) is externally supplied to the memory cell that is still in state "0" after writing to the lower page, the memory cell becomes state "2". And as shown at S4 in FIG. 2, when data (1) is externally supplied to the memory cell that is in state "1" after writing to the lower page, the memory cell remains in state "1". Also, as shown at S5 in FIG. 2, when data (1) is externally supplied to the memory cell that is still in state "0" after writing to the lower page, the memory cell remains in state "0" and does not change.

Here, for multivalued memory, the CPU 14 needs to accurately control the threshold voltage of the memory cell as appropriate for written data. That is to say, due to concern about over-programming, which means excess of threshold voltage over a predetermined level, a step-up writing method is employed.

A lower page writing program based on the step-up writing method repeats a voltage applying operation of applying a voltage to a memory cell while gradually increasing the voltage starting at a low writing voltage and a verify-read operation of checking whether the memory cell is of a predetermined threshold voltage.

On the other hand, an upper page program performs internal data loading in order to check and memorize whether the memory cell is in state "0" or "1" before writing upper page data. Subsequently, as the lower page writing program, a voltage applying operation of applying a voltage while gradually increasing the voltage and a verify-read operation of checking whether the memory cell is of a correct threshold voltage are repeated.

That is to say, since operations of the upper page writing program are more complicated than those of the lower page writing program as shown above, the upper page writing program has a longer program time. For example, assuming that the lower page writing program time is $T_{D2L}$, the upper page writing program time is about threefold, $3 \times T_{D2L}$, for example.

Here, when processing speed in the memory system is low with respect to the data transfer rate from the host, a time difference associated with latency develops to degrade writing performance. One way to solve this problem is the memory interleaving manner.

As already mentioned, however, in a memory system having multivalued memory cells capable of storing two-bit data, a program executed by the CPU 14 for writing data to the memory section is composed of two types of writing programs having different program times, namely the lower page program of a short program time and the upper page program of a long program time. In other words, in a memory system having multivalued memory cells capable of storing N-bit data (N being an integer $\geq 2$), the program executed by the CPU 14 consists of N types of writing programs having different program times.

Here, using FIGS. 3 and 4, a writing program based on a memory interleaving manner for use in a known memory system having multivalued memory cells capable of storing two-bit data will be described. Note that in timing charts shown in FIG. 4 and the like shown below, the horizontal axis is partially enlarged or reduced in size for facilitating illustration. Also, a plane shown in FIG. 3 and other figures is a set of multiple memory cells connected in series, and the memory section is composed of a number of planes.

Figure 3:
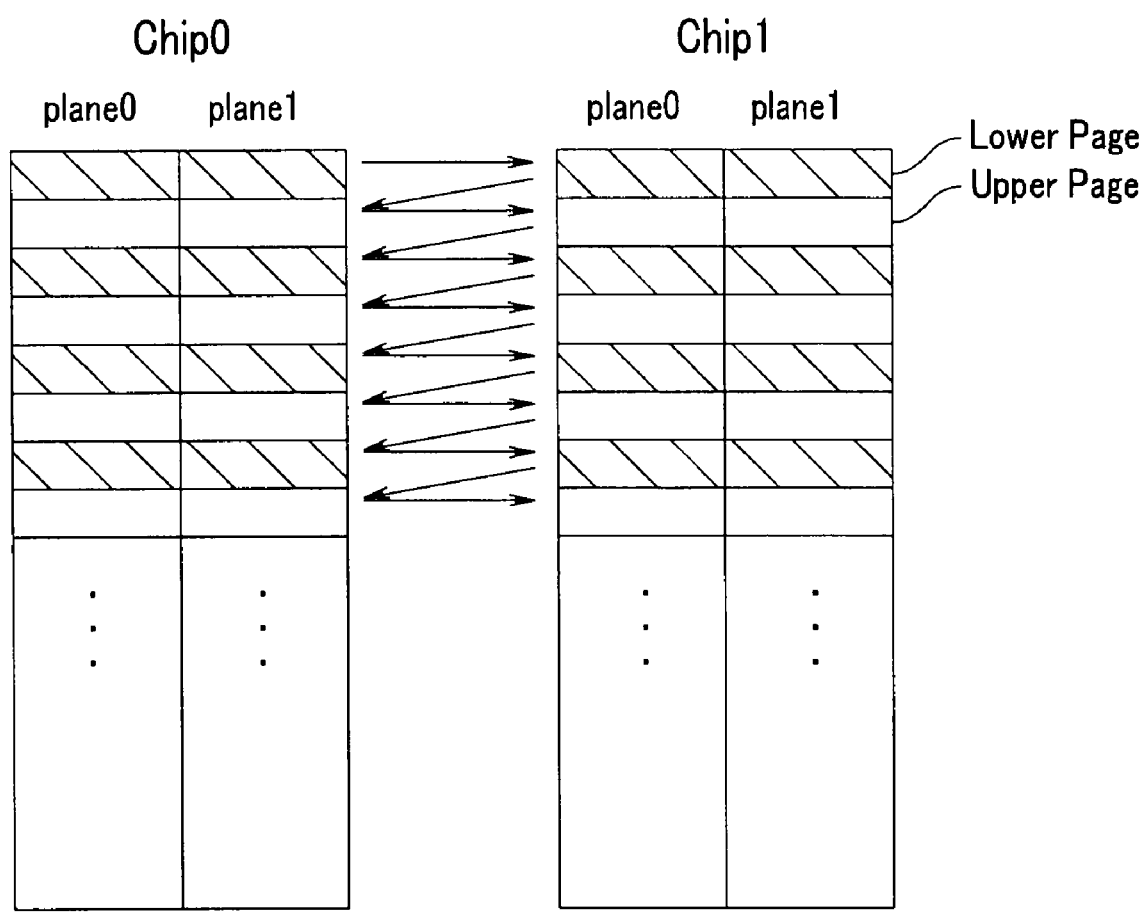
FIG. 3 is a diagram for illustrating writing processing in a memory interleaving manner in a known memory system.

As indicated by arrows in FIG. 3, in a known memory system having a memory section consisting of two chips, chip 0 and chip 1, a CPU executes a writing process alternately on the chip 0 and the chip 1 on a page-by-page basis. That is to say, as shown in FIG. 4, the CPU performs a data transfer (Data In) process on the lower page on chip 0 shown at T1 to T2, a data transfer process on the lower page on chip 1 shown at T2 to T3, a data transfer process on the upper page on chip 0 shown at T3 to T4, and a data transfer process on the upper page on chip 1 shown at T4 to T5, and after completion of the data transfer processes, executes writing programs.

That is to say, the CPU processes Data In to the chip 1 and starts a writing program for the chip 1 while the chip 0 is busy, and then, while the chip 1 is busy, processes Data In to the chip 0 and starts a writing program for the chip 0. In other words, in the known memory system, the CPU executes a page writing program of one type on a memory cell of one chip, and thereafter executes a page writing program of the same one type on a memory cell of another chip, and then executes a page writing program of a different type.

Figure 4:
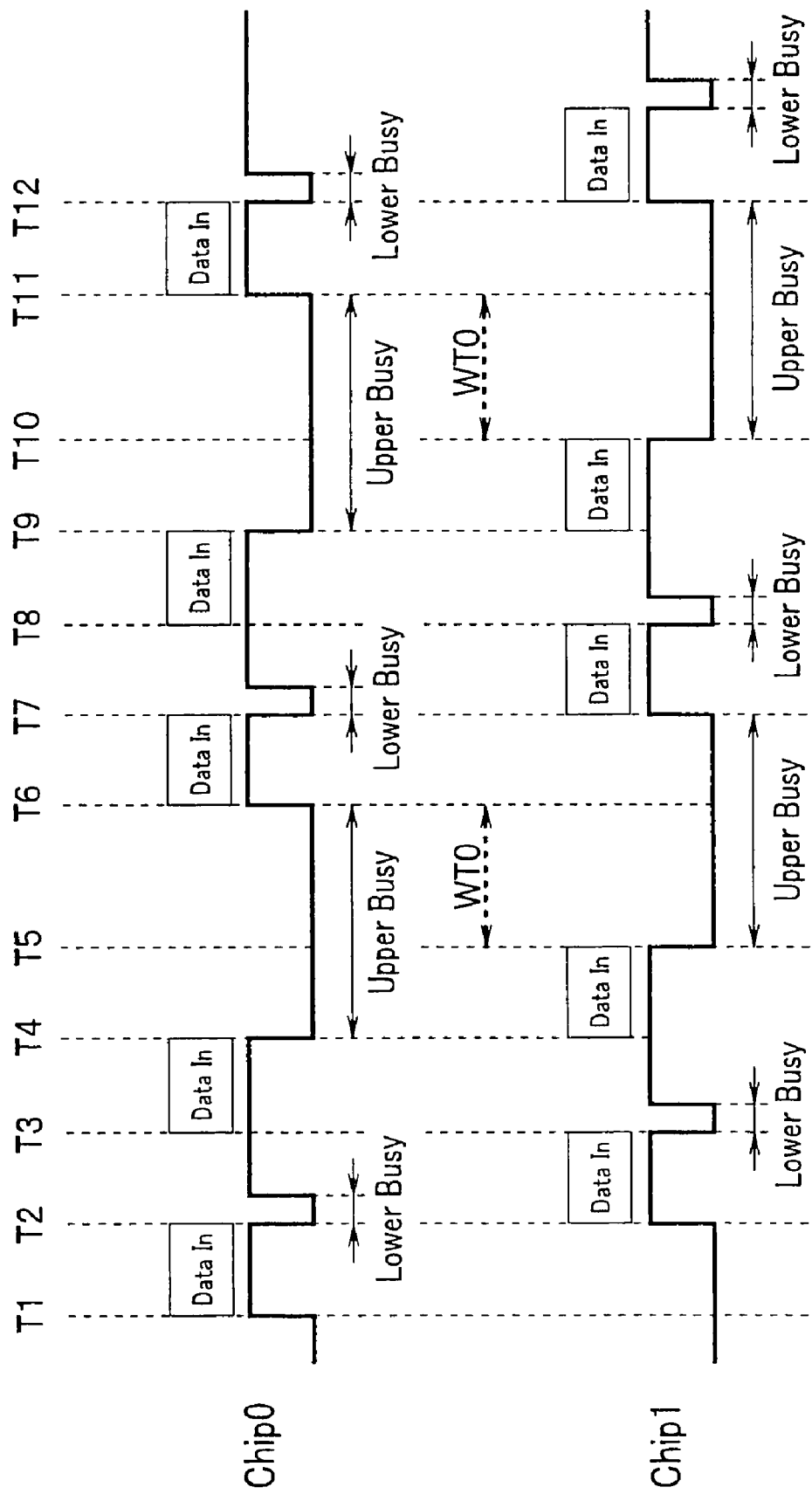
FIG. 4 is a timing chart of writing programs in a memory interleaving manner in a known memory system.

As illustrated in FIG. 4, in the known memory system described above, a wasted time WT0 occurs when upper page writing programs for the chip 0 and chip 1 are concurrently executed. This is due to the fact that the upper page program time is longer than the lower page program time as already described.

Figure 5:
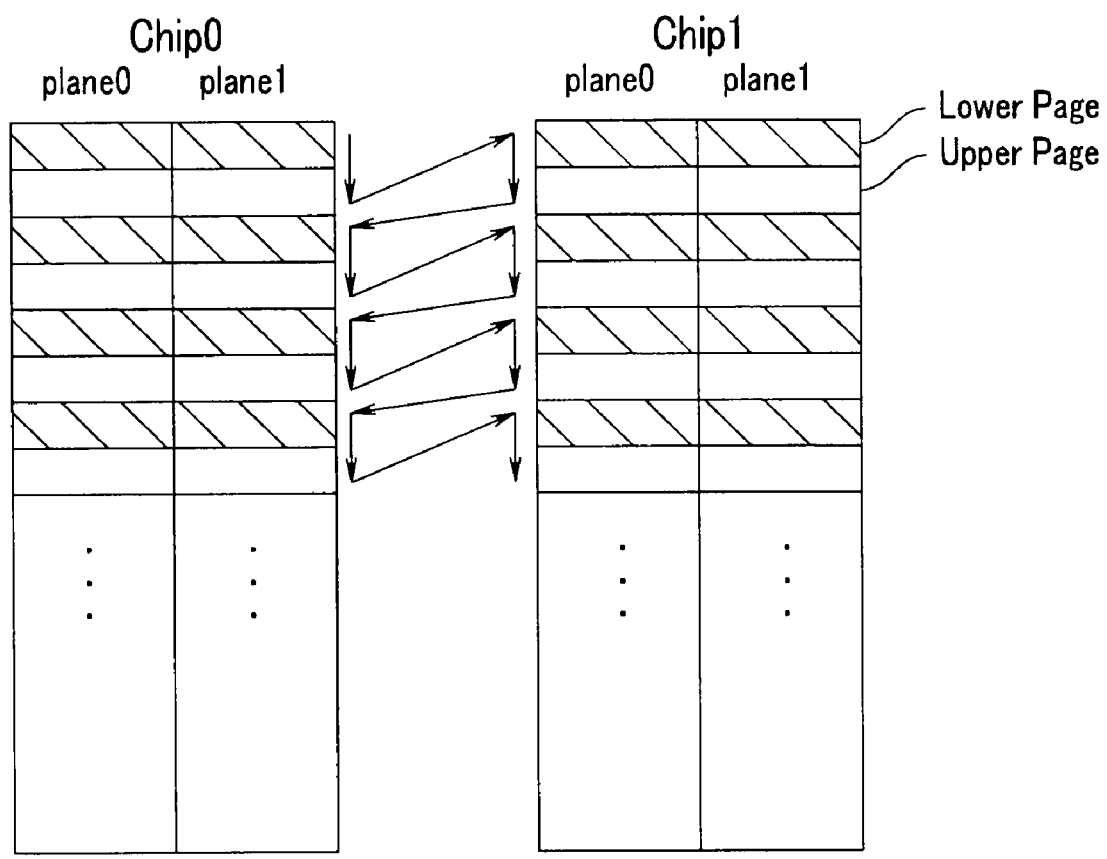
FIG. 5 is a diagram for illustrating writing processing by a memory controller of the first embodiment in a memory interleaving manner.

Next, using FIGS. 5 and 6, a writing program based on a memory interleaving manner that is executed by the CPU 14 of the memory controller 2 according to the present embodiment will be described. As shown by arrows in FIG. 5, in the memory system 1, the CPU 14 executes writing programs of two types on a memory cell of the chip 0 and writing programs of two types on a memory cell of the chip 1 in a memory interleaving manner. That is to say, in the memory system 1, the CPU 14 executes writing programs of two types repeatedly, i.e., the lower page writing program for the chip 0 and the upper page writing program for the chip 0, and thereafter executes writing programs of two types, i.e., the lower page writing program for the chip 1 and the upper page writing program for the chip 1, in a memory interleaving manner. To further put it differently, the CPU 14 of the memory controller 2 according to the present embodiment executes all of the N types of page writing programs into a memory cell which belongs to one chip and thereafter executes all of the N types of page writing programs into a memory cell which belongs to another chip.

Figure 6:
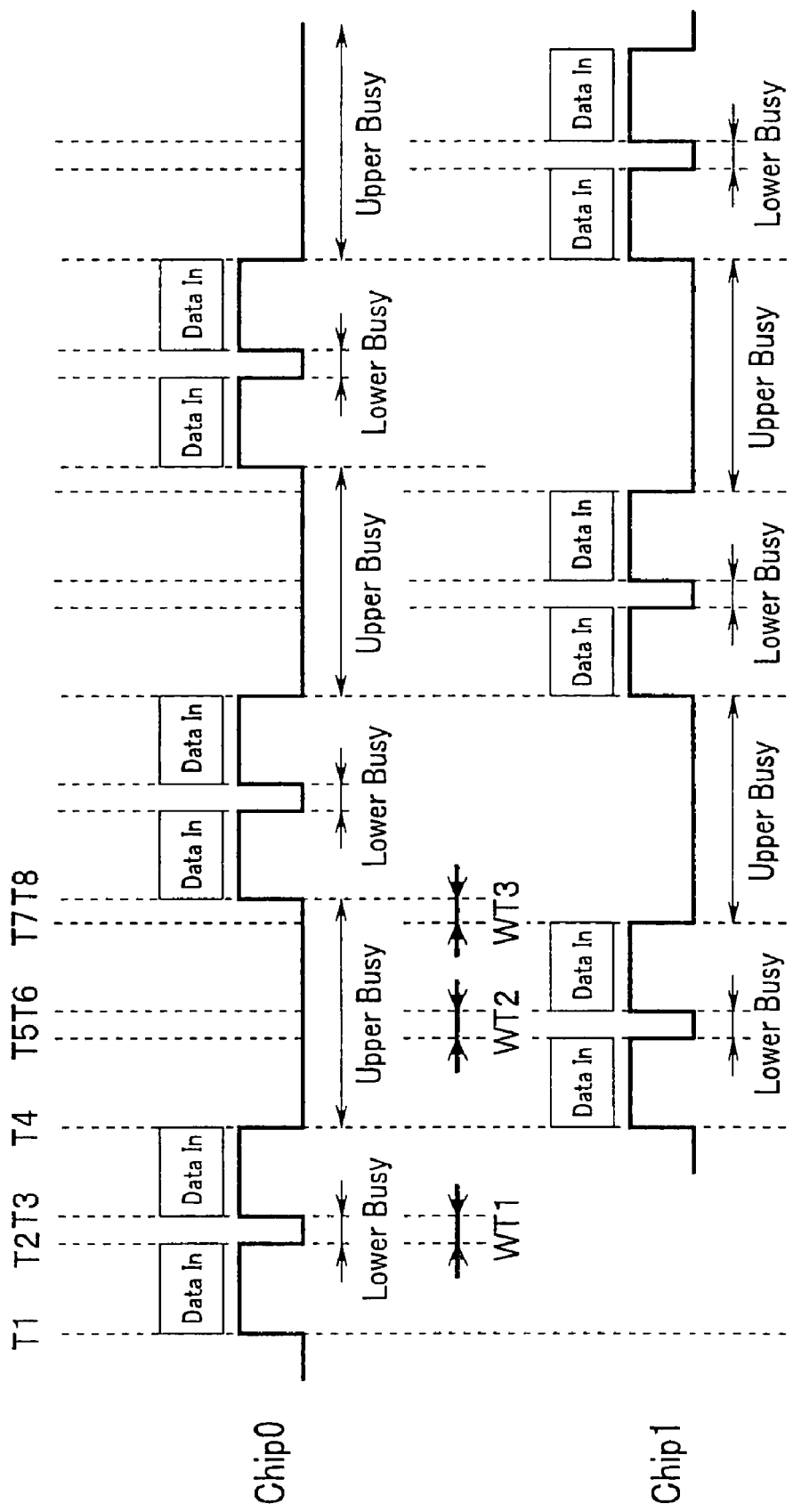
FIG. 6 is a timing chart at a time of writing by the memory controller of the first embodiment in a memory interleaving manner.

After Data In processing to the lower page of chip 0 shown at T1 to T2 in FIG. 6, the CPU 14 of the memory system 1 starts a writing program for the lower page at T2, and after release of Busy state, starts Data In processing for the upper page of the chip 0 at T3, and starts the upper page writing program for chip 0 at T4. And in parallel with the writing program for the chip 0, the CPU 14 starts Data In processing to the lower page of the chip 1 at T4, and starts the lower page writing program for the chip 1 at T5. Then, the CPU 14 starts Data In processing on the upper page of the chip 1 at T6, and starts the upper page writing program for the chip 1 at T7 repeatedly.

As has been described, the memory controller 2 is a memory controller having the CPU 14 configured to control programs for writing data to a semiconductor memory section made up of two chips, the chips being composed of a large number of memory cells capable of storing two-bit data in one memory cell, wherein a two-bit data writing program executed by the CPU 14 is composed of two types of page writing programs with different program times, and the CPU 14 executes the writing programs repeatedly on all of two types of pages in a memory cell which belongs to one chip and the writing programs on all of two types of pages in a memory cell which belongs to another chip in a memory interleaving manner.

Since the CPU 14 of the memory system 1 can execute Data In processing on the lower page, a writing program, and Data In processing on the upper page of another chip during the program time for the upper page of one chip, wasted time WT3 is short. In FIG. 6, as the times between T2 and T3 (WT1) and between T5 and T6 (WT2) are also wasted time, wasted time in the memory system 1 is a sum of WT1 to WT3.

However, when compared with wasted time (WT0) in the known memory system, wasted time (WT1+WT2+WT3) of the memory system 1 of the present embodiment is shorter. Accordingly, the memory controller 2 of the present embodiment provides a high writing speed. In addition, the memory system 1 having the memory controller 2 of the present embodiment and a control method for the memory system 1 provide a high writing speed.

As has been described, a control method for a memory system 1 is the method including: first writing step of executing writing programs for all of N types of pages in a memory cell which belongs to one of chips of a semiconductor memory section, the semiconductor memory section being made up of a plurality of chips that are composed of a large number of memory cells capable of storing N-bit data (N being an integer $\geq 2$) in one memory cell in units of N types of pages; and second writing step of executing writing programs for all of the N types of pages in a memory cell which belongs to another one of the chips, wherein the first writing step and the second writing step are executing alternately.

Second Embodiment

Hereinafter, a memory system 101 and a memory controller 102 according to a second embodiment of the present invention will be described with reference to drawings.

Figure 7:
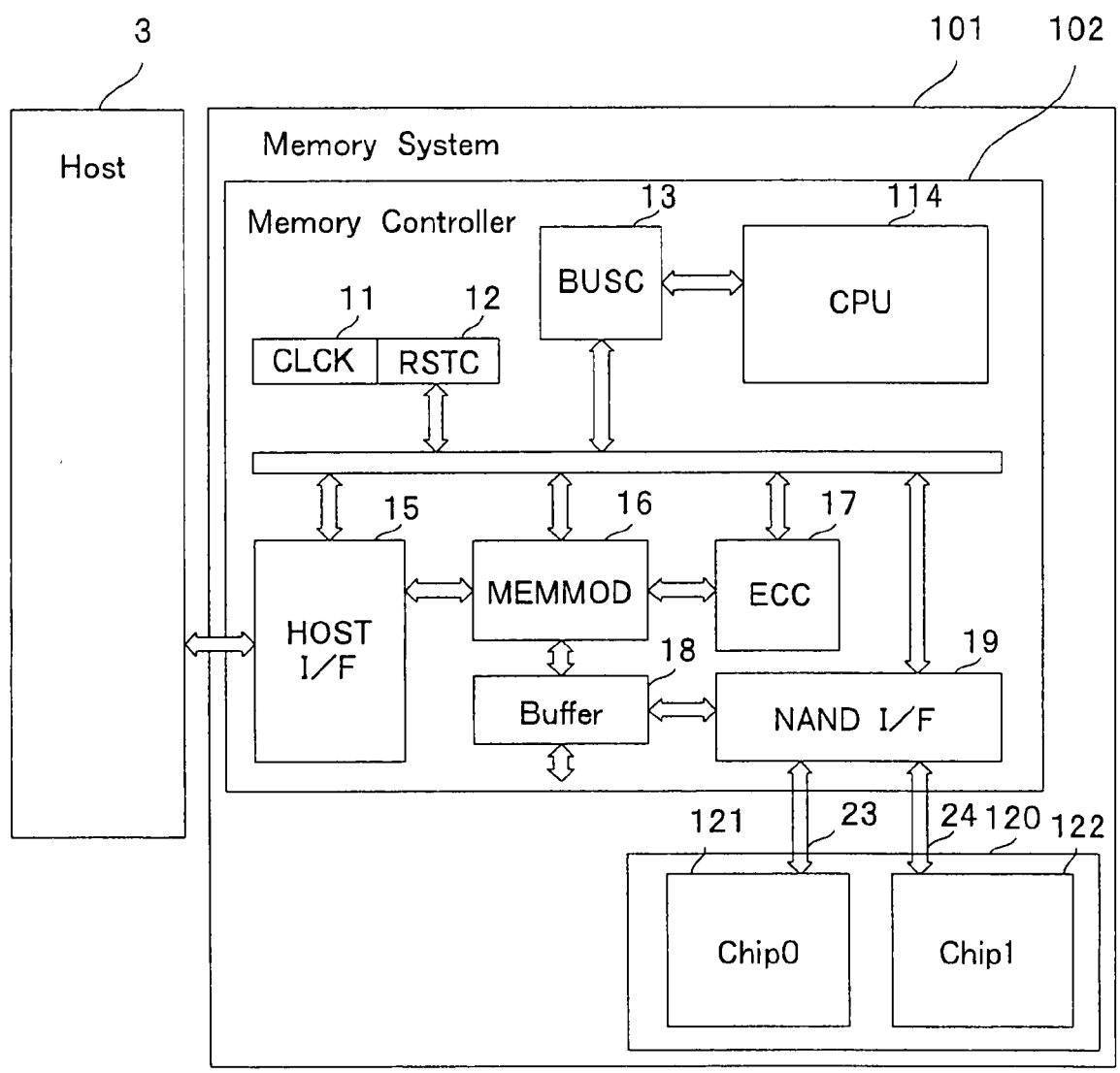
FIG. 7 shows a configuration of a memory system according to a second embodiment.

FIG. 7 shows a configuration of the memory system 101 according to the second embodiment. As the memory system 101 and memory controller 102 of the present embodiment are similar to the memory system 1 and memory controller 2 of the first embodiment, the same components are given the same reference numerals and description of such components is omitted. In FIG. 7, selection signal lines and Ready/Busy signal lines are not shown.

As shown in FIG. 7, two chips 121 and 122 that constitute a memory section 120 of the memory system 101 of the present embodiment have 8-value memory cells capable of storing three-bit data in one memory cell.

In the memory system 101, to write three-bit data into one memory cell, the data to be stored is divided into first page data, second page data, and third page data, which are units of writing, and the first page data, the second page data, and the third page data are sequentially written to the single memory cell. That is to say, in the memory controller 102, the CPU 114 first executes a first page writing program, then a second page writing program, and finally a third page writing program, causing the threshold voltage of the memory cell to shift or change to a higher level. Hereinafter, the first page may also be referred to as a "lower page", the second page as a "middle page", and the third page as an "upper page".

For example, assuming that a writing program time of the lower page is $T_{D3L}$, a writing program time $T_{D3M}$ of the middle page is about $4 \times T_{D3L}$ and a writing program time of the upper page $T_{D3U}$ is about $15 \times T_{D3L}$. That is to say, in the memory system 101, the writing program time of the upper page is significantly longer than that of the other pages.

Figure 8:
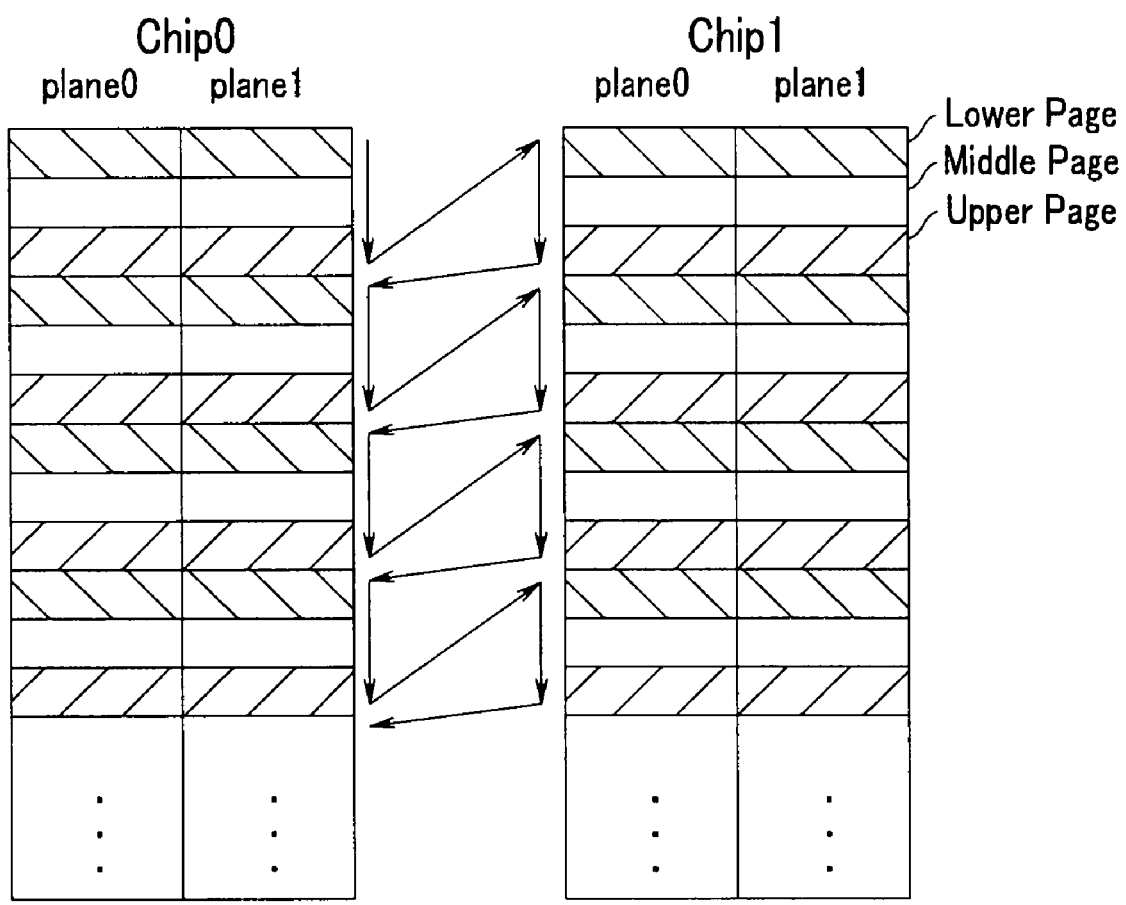
FIG. 8 is a diagram for illustrating writing processing in a memory interleaving manner by the memory controller of the second embodiment.

Now, using FIG. 8, processing performed by the memory controller 102 of the present embodiment is described.

As indicated by the arrows in FIG. 8, the CPU 114 of the memory controller 102 first executes the lower page writing program for the chip 0, then the middle page writing program for the chip 0, and then the upper page writing program the for chip 0, which has the longest program time. Thereafter, the CPU 114 changes the chip as a target of writing to the chip 1 and executes the lower page writing program for the chip 1, the middle page writing program for the chip 1, and the upper page writing program for the chip 1, repeatedly.

That is to say, the memory controller 102 is the memory controller 102 having the CPU 114 that controls programs for writing data to the memory section 120 made up of two chips 121 and 122, the chips being composed of a large number of memory cells capable of storing three-bit data in one memory cell, wherein a three-bit data writing program is composed of three types of page writing programs of different program times, and the program is for executing writing programs repeatedly on all of the three types of pages in a memory cell which belongs to one chip and writing programs on all of the three types of pages in a memory cell which belongs to another chip in an interleaving manner.

Since the memory controller 102 can execute writing programs for one chip during the upper page program time on another chip, wasted time is short. Accordingly, the memory controller 102 of the present embodiment provides a high writing speed. Also, the memory system 101 having the memory controller 102 of the present embodiment and a control method for the memory system 101 provide a high writing speed.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A memory controller configured to control a program for writing data, in an interleaved manner, into a semiconductor memory section which is made up of a plurality of memory chips that are composed of memory cells, each of the memory cells being capable of storing N-bit data (N being an integer $\geq 2$), wherein
    the program includes a first program configured to write data into a first page of one of the memory cells in a first program time, and an Nth program configured to write data into an Nth page of one of the memory cells in an Nth program time which is longer than the first program time, and
    the first program and the Nth program are executed for one of the plurality of memory chips, and thereafter the first program and the Nth program are executed for another one of the plurality of memory chips.

2. The memory controller according to claim 1, wherein the plurality of chips are two chips.

3. The memory controller according to claim 2, wherein the N is 2 or 3.

4. The memory controller according to claim 3, wherein the memory cells are NAND-type flash memory cells.

5. A memory system, comprising:
    a semiconductor memory section which is made up of a plurality of memory chips that are composed of memory cells, each of the memory cells being capable of storing N-bit data (N being an integer $\geq 2$); and
    a memory controller configured to control a program for writing data into the semiconductor memory section in an interleaved manner, wherein
    the program includes a first program configured to write data into a first page of one of the memory cells in a first program time, and an Nth program configured to write data into an Nth page of one of the memory cells in an Nth program time which is longer than the first program time, and
    the memory controller executes the first program and the Nth program for one of the plurality of memory chips, and thereafter executes the first program and the Nth program for another one of the plurality of memory chips.

6. The memory system according to claim 5, wherein the plurality of chips are two chips.

7. The memory system according to claim 6, wherein the N is 2 or 3.

8. The memory system according to claim 7, wherein the memory cells are NAND-type flash memory cells.

9. A control method implemented on a memory system, the memory system including a plurality of memory chips that are composed of memory cells, each of the memory cells being capable of storing N-bit data (N being an integer $\geq 2$), the method comprising:
    writing data into a first page of one of the plurality of memory chips in a first program time and writing data into an Nth page of the one of the plurality of memory chips in an Nth program time which is longer than the first program time, and
    writing data into a first page of another one of the plurality of memory chips in the first program time, and writing data into an Nth page of the another one of the plurality of memory chips in the Nth program time.

10. The control method for a memory system according to claim 9, wherein the plurality of chips are two chips.

11. The control method for a memory system according to claim 10, wherein the N is 2 or 3.

12. The control method for a memory system according to claim 11, wherein the memory cells are NAND-type flash memory cells.

* * * * *